Jan. 26, 1960  J. H. WERNIG  2,922,675
SELF-DRAINING WEATHER STRIP FOR VEHICLE CLOSURE
Filed Dec. 6, 1955  3 Sheets-Sheet 1

INVENTOR.
James H. Wernig
BY Paul Fitzpatrick
ATTORNEY

Jan. 26, 1960   J. H. WERNIG   2,922,675
SELF-DRAINING WEATHER STRIP FOR VEHICLE CLOSURE
Filed Dec. 6, 1955   3 Sheets-Sheet 2
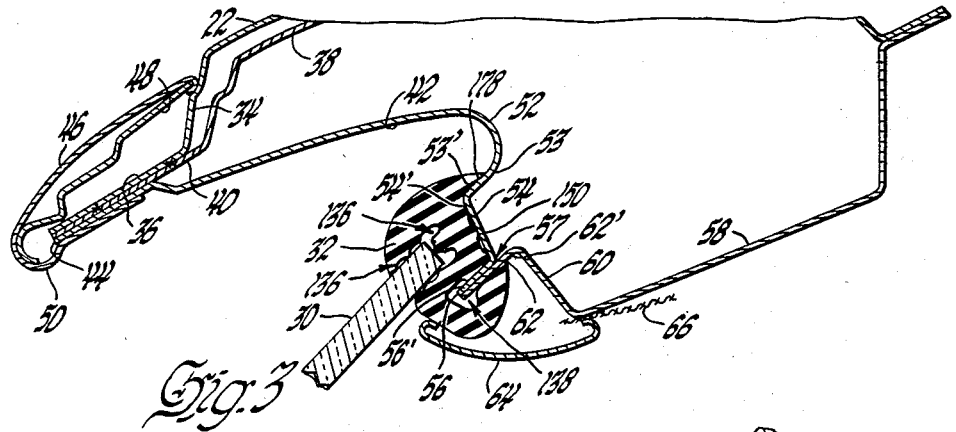
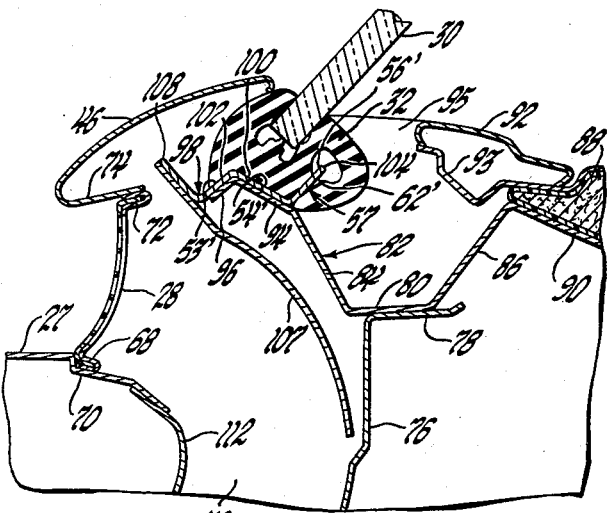
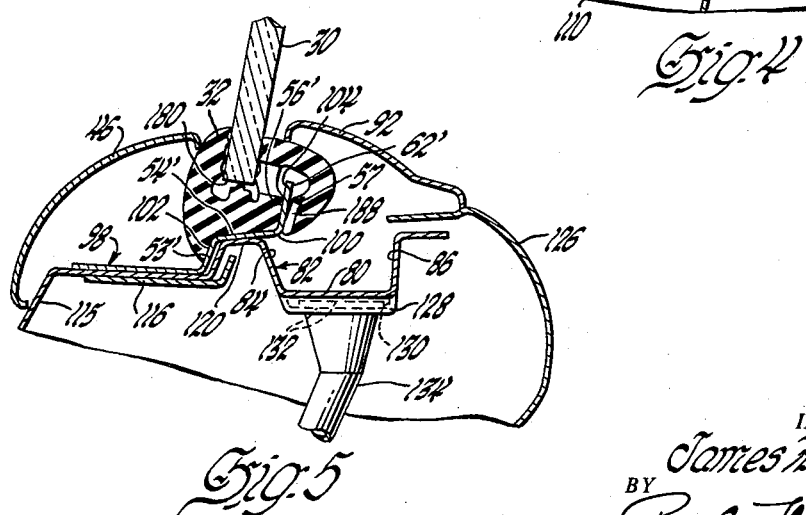
INVENTOR.
James H. Wernig
BY
Paul Fitzpatrick
ATTORNEY Jan. 26, 1960  J. H. WERNIG  2,922,675
SELF-DRAINING WEATHER STRIP FOR VEHICLE CLOSURE
Filed Dec. 6, 1955  3 Sheets-Sheet 3
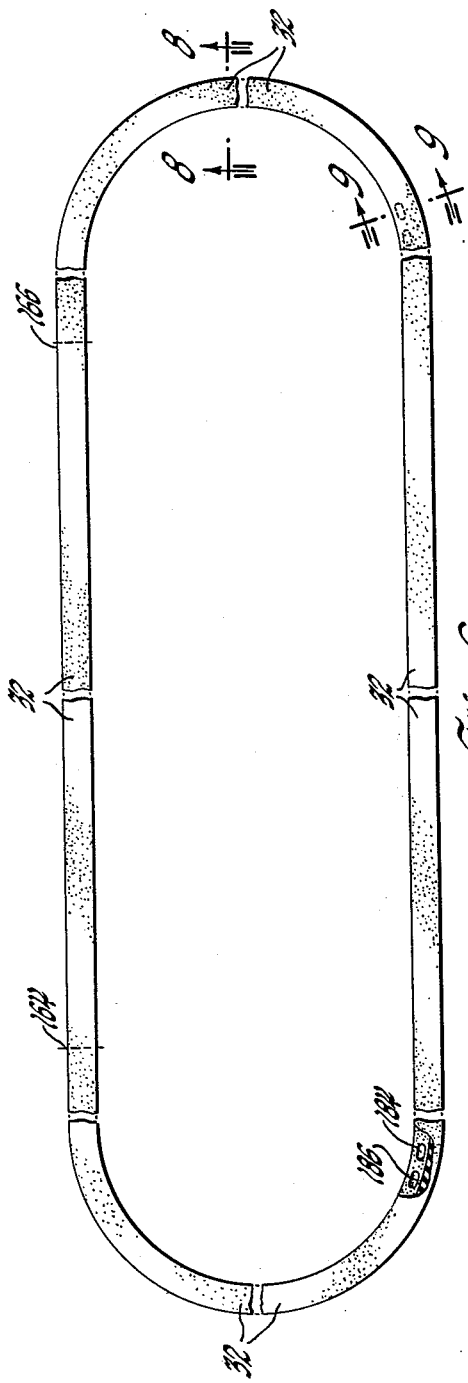
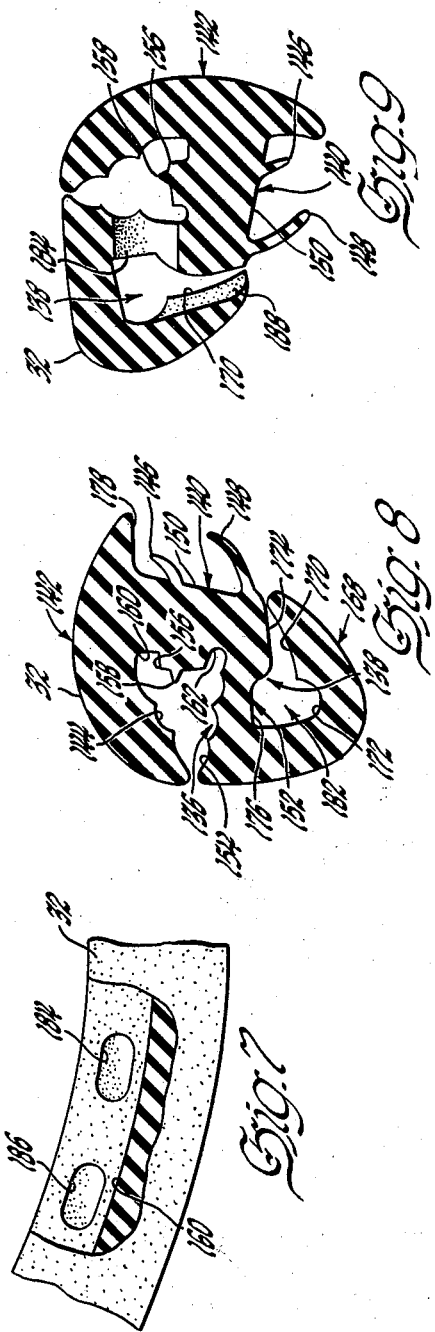
INVENTOR.
James H. Wernig
BY
Paul Fitzpatrick
ATTORNEY

United States Patent Office 2,922,675
Patented Jan. 26, 1960

2,922,675

SELF-DRAINING WEATHER STRIP FOR VEHICLE CLOSURE

James H. Wernig, Birmingham, Mich., assignor to General Motors Corporation, Detroit, Mich., a corporation of Delaware Application December 6, 1955, Serial No. 551,301

7 Claims. (Cl. 296—93)

This invention relates to weather strips for vehicle closures and more particularly to a self-draining weather strip for a vehicle window or windshield.

In many present production vehicles, the windshield is mounted on the body by means of a continuous flexible weather strip which is secured to the body in a suitable manner adjacent the windshield opening and includes a continuous channel receiving the edge of the windshield. Due to production variations, the weather strip and windshield may not provide an effective seal for the body to prevent air and moisture leaks into the body from between the weather strip channel and the windshield. In order to provide an effective seal, a sealer or adhesive may be placed in the weather strip channel after installation of the windshield. After a period of time, the adhesive often cracks and must be resealed from time to time in order to retain the seal between the windshield and the weather strip.

Since the advent of the "wrap around windshield" the problem of air and moisture leaks into the body from between the windshield and the weather strip has been increased due to the increased sealing area between the windshield and the weather strip. The problem of leakage into the body also increases to some extent when the vehicle is being driven. Under certain ventilation conditions, a pressure differential may be created between the interior of the body and the outside atmosphere, with the pressure within the body being lower. This pressure differential tends to drain moisture into the body from between the windshield and the weather strip.

This invention solves the problem of leakage of moisture into the body from between the windshield and the weather strip by providing a self-draining weather strip which will collect moisture entering into the weather strip channel and drain this moisture to the exterior of the body to prevent entry thereof interiorly of the body. The weather strip of this invention does not require the use of any sealer or adhesive since it is intended that moisture will enter and collect in the weather strip channel. Thus, the self-draining weather strip of this invention will overcome many of the problems attendant with the use of present windshield weather strips. It should also be noted that the same problems arise in conjunction with the vehicle backlite and the weather strip which mounts the backlite on the body in a similar manner as the windshield.

An object of this invention is to provide an improved weather strip for vehicle closures. Another object of this invention is to provide a self-draining weather strip for vehicle windows which will prevent leakage of moisture into the vehicle body.

A more specific object of this invention is to provide a self-draining weather strip for a vehicle windshield which will prevent leakage of water into the vehicle body and yet provide an effective seal between the weather strip and the windshield. A further specific object of this invention is to provide a self-draining weather strip for mounting a vericle windshield on the body without use of sealers or adhesives and yet providing an adequate and effective seal against moisture entering the interior of the body from between the windshield and the weather strip.

These and other objects of this invention will be readily apparent from the following specification and drawings, in which:

Figure 3 is a sectional view on the plane indicated by line 3—3 of Figure 1;

Figure 4 is a sectional view on the plane indicated by line 4—4 of Figure 1;

Figure 5 is a sectional view on the plane indicated by line 5—5 of Figure 2;

Figure 6 is a plan view of a weather strip according to this invention prior to being mounted on the vehicle body, with a portion being broken away for clarity;

Fig. 7 is an enlarged view of the broken away portion of Figure 6;

Figure 8 is a sectional view on the plane indicated by line 8—8 of Figure 6; and Figure 9 is a sectional view on the plane indicated by line 9—9 of Figure 6.

Figure 1:
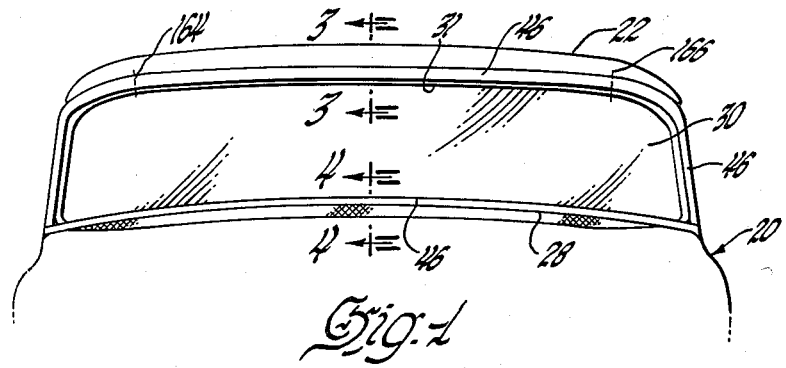
Figure 1 is a partial front elevational view of a vehicle body having a windshield mounted on the body by a weather strip according to this invention.
Figure 2:
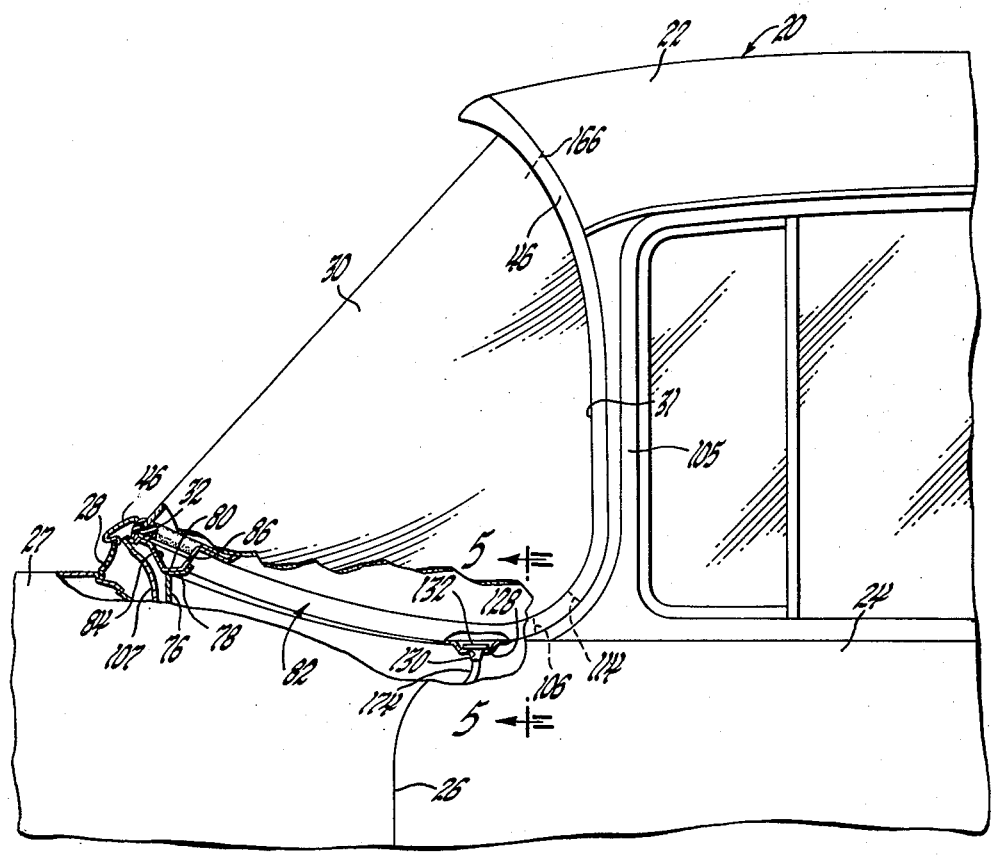
Figure 2 is a partial side elevational view of the vehicle body of Figure 1, with parts being broken away for clarity.

Referring now to Figures 1 and 2 of the drawings, a vehicle body 20 includes a roof panel 22, a front door 24 on either side of the body hinged at its forward edge 26 to the body and latched at its rearward edge thereon, an outer cowl panel 27, an air inlet screen 28 to provide outside air for the vehicle heating and ventilation system, and a curved windshield 30 which is mounted on the body within the windshield opening 31 in a suitable manner by the continuous flexible weather strip 32 of this invention as will be described.

Referring now to Figure 3 of the drawings, the roof panel 22 of the body includes an offset flanged portion 34 which terminates in a laterally extending flange 36. A reinforcing member 38 positioned below the roof panel terminates in a laterally extending flange 40 which is spot welded or otherwise secured to flange 36 of the roof panel. A visor panel 42 also terminates in a laterally extending flange 44 which is spot welded or otherwise secured to flanges 36 and 40 to form a rigid laterally extending terminal body flange. A trim molding 46 provided with a reinforcing member 48 includes a clip portion 50 which fits against flange 44 of the visor panel 42 to mount the trim molding on the terminal body flange within the recess defined by the offset portion 34 and flange 36 of roof panel 22. Trim molding 46 extends entirely around the body windshield opening 31 as shown in Figures 1 and 2, although it is secured to the body at different places in a different manner.

The visor panel 42 includes an arcuate portion 52 having a leg portion 53 joined to a flanged portion 54 which terminates in a laterally extending flange 56. A roof header panel 58 includes a flanged portion 60 terminating in a laterally extending flange 62 which is spot welded or otherwise secured to flange 56 to define what is commonly known in the automotive body art as a "pinch weld." An inner garnish molding 64 may be secured to panel 58 in a suitable manner to conceal the front edge portion of the vehicle headlining 66 which terminates within the area defined by flanged portion 60 and flange 62 of panel 58 and the garnish molding 64. The headlining is secured to panel 58 in a suitable manner as is well known in the art.

The outer surfaces 53', 54', and 56' of leg portion 53, flanged portion 54, and flange 56, respectively, define an offset outer body sealing surface for weather strip 32 as shown in Figure 3. This outer body sealing surface is continuous, extending entirely around the body windshield opening, although it may be defined by various body structural members as will be hereinafter described. The inner surface 62' of flange 62 defines an inner body sealing surface for weather strip 32. This inner body sealing surface is also continuous, although it may be defined by various body structural members as will be described. Thus, it can be seen that surface portion 56' of the outer body sealing surface, and the inner body sealing surface 62' are defined by a continuous flange structure 57 which extends inwardly within the body windshield opening.

Referring now to Figure 4 of the drawings, the air inlet screen 28 includes a lower laterally extending flange 68 secured in a suitable manner to an offset flange 70 of cowl panel 27, and an upper laterally extending flange 72 secured in a suitable manner to an inwardly extending flange 74 of the trim molding 46 in order to mount the trim molding on the vehicle body. The body fire wall structural member 76 includes a laterally inwardly extending flange 78 which is secured in a suitable manner to the base 80 of a drain trough 82 having side walls 84 and 86 defining a trough with base portion 80. The drain trough spans the body transversely thereof and is of arcuate shape as can be seen in Figure 2. A vehicle dash pad 88 is secured in a suitable manner to a laterally extending flange 90 of wall 86 and an inner trim molding 92 is supported on a body structural member 93. As can be seen in Figure 4, the inner trim molding 92 is of the general curvature of windshield 30 and is spaced from weather strip 32 to define a crescent shaped opening 95 therebetween. Although not shown in the drawings, the vehicle ventilation system includes nozzles which project through wall 86 of drain trough 82 to provide for defrosting of the windshield.

Wall 84 includes a laterally extending flanged portion 94 and a laterally extending terminal flange 96. An offset flanged member 98 which may be called a "pinch weld member" includes flanged portions 100 and 102 secured respectively to flanged portion 94 and flange 96 of wall 84 to mount member 98 on the body. Flanged portion 100 terminates in a laterally extending flange 104 extending inwardly within the body windshield opening in the same manner as flanges 56 and 62 of the visor panel 42 and panel 58, respectively, as previously described in conjunction with Figure 3. The continuous flange structure 57 is defined by flanges 56 and 62 across the top of the windshield opening 31, and by similar double flange structure along the sides of the windshield opening in the area of the door pillars 105. The offset flanged member 98 extends continuously around the bottom of the windshield opening as can be seen in Figures 4 and 5 and is secured to the double flange structure along the sides of the windshield at 106, Figure 2. The outer surface of flanged portions 100 and 102 and flange 104 define, respectively, the outer body sealing surface portions 54', 53' and 56' around the lower edge of the windshield, while the inner surface of flange 104 defines the inner body sealing surface 62'.

A deflector 107 is spot welded or otherwise secured to a laterally extending terminal flange 108 of member 98 in order to mount the deflector member on the body in a position to deflect air entering through the ventilator screen 28 downwardly into the passage 110 defined by the vehicle fire wall member 76 and a structural member 112 which is spot welded or otherwise secured to the offset flange 70 of the outer cowl panel 27. As shown in Figure 2 of the drawings, the arcuately shaped drain trough 82 extends entirely around the lower edge of the windshield and terminates approximately at 114 on either side of the body.

Referring now particularly to Figure 5 of the drawings, the drain trough 82 is supported on the body in this area by being formed integral with a body inner cowl member 115, with a reinforcing member 116 being provided to impart rigidity to the structure. The offset flanged member 98 is spot welded or otherwise secured to cowl member 115 and reinforcing member 116 and to a laterally extending flange portion 120 of wall 84 of the drain trough. The inner trim molding 92 is secured in a suitable manner to an inner trim member at 126.

Referring now to Figures 4 and 5, the opening 95 formed between the inner trim molding 92 and windshield 30 is of crescent shape and terminates forward of the body cross-section shown in Figure 5 on either side of the body. Thus, although the drain trough 82 is open for most of its length, part of the length of the trough is covered by the inner trim molding 92. As shown in Figure 5, the base 80 of the drain trough 82 is offset at 128 on either side of the body and provided with an aperture 130 which receives the flanged end 132 of a flexible drain tube 134 opening exteriorly of the body.

As can be seen in Figures 6 and 8, weather strip 32 is formed as a continuous member and includes oppositely opening channels 136 and 138 receiving, respectively, the windshield 30 and the continuous flange structure 57 around the body windshield opening 31.

Referring now particularly to Figures 6 through 9 of the drawings, weather strip 32 includes a leg portion 140 joined to an outer leg portion 142, with wall 144 of leg portion 142 being of ribbed form to form the outer wall of the windshield receiving channel 136. A pair of spaced thin flexible lips 146 and 148 extend laterally from surface 150 of leg portion 140. An intermediate leg portion 152 extends laterally from leg portion 140 in spaced relationship with leg portion 142 and includes a ribbed wall 154 which forms the inner wall of the windshield receiving channel 136. The base of channel 136 is formed by one wall of leg portion 140 and is provided with an inwardly extending rib 156 having a thin flexible continuous lip 158. Rib 156 together with walls 144 and 154 of channel 136 defines a pair of moisture receiving drain passages 160 and 162. An arcuate leg portion 168 is joined to leg portion 152, with wall 170 of the leg defining the inner wall of the flange structure 57 receiving channel 138 and being provided with a continuous groove 172. The wall 174 of leg 152 defines the outer wall of the flange structure 57 receiving channel 138 and is provided with a continuous groove 176 opposite groove 172.

Referring now to Figures 3, 4, 5, and 8 of the drawings, the weather strip is mounted on the body with surface 178 of leg portion 142 in engagement with outer body sealing surface portion 53'; surface 150 of leg portion 140 in engagement with outer body sealing surface portion 54'; windshield 30 being received within channel 136 in engagement with ribbed walls 144 and 154, respectively, on its inner and outer surfaces adjacent the edge 180 thereof which is in engagement with the thin flexible lip 158 at the base of channel 136; wall 174 of leg portion 152 in engagement with outer body sealing surface 56'; wall 170 of arcuate leg portion 168 in engagement with the inner body sealing surface 62'; and with the continuous flange structure 57 being received within channel 138 as hereinbefore described and being spaced from the base of the channel so that grooves 172 and 176 and the base of channel 138 define a continuous drain passage 182.

Upon consideration of Figures 3, 4, 5, and 8, it will be seen that it is possible for moisture to enter the body by passing between ribbed wall 144 and the outer surface of the windshield to drain passage 160, then past the edge 180 of the windshield and lip 158 to drain passage 162, and then into the body between ribbed wall 154 of the windshield receiving channel and the inner surface of the windshield. Due to production variations, the windshield does not always fit exactly within the windshield receiving channel and may be misaligned relative thereto to provide discontinuous areas of sealing between the windshield and one or the other walls of the windshield receiving channel. It is common to place a sealer within the windshield receiving channel to take care of this misalignment and seal the windshield to the walls of the windshield receiving channel. However, this sealer or adhesive often cracks after a period of time so that a continuous seal is not always present between the windshield and the windshield receiving channel in the weather strip.

In the present weather strip construction no sealer or adhesive is used. Any moisture entering between the outer surface of the windshield and the adjacent wall 144 of the windshield receiving channel 136 will pass into either one or the other drain passages 160 and 162. Upon consideration of Figures 1 and 2, it will be noted that the highest point on the upper edge of the windshield is at the center line of the body and then the upper edge of the windshield gradually tapers to the sides thereof. Thus, any moisture which enters passages 160 and 162 will flow in these passages toward the sides of the windshield since it is easier for the moisture to flow in these rather unrestricted passages than to drain into the body from between the inner wall 154 of the windshield receiving channel 136 and the inner surface of the windshield. Drain passages 160 and 162 also have their highest point at the center line of the body across the upper edge of the windshield. The problem of sealing across the upper edge of the windshield between points 164 and 166 is not as great as along the lower edge of the windshield since moisture entering between the outer surface of the windshield and wall 144 of channel 136 along the upper edge of the windshield must flow upwardly into passages 160 and 162.

Referring now to Figures 4 and 5, any moisture entering between the outer surface of the windshield and wall 144 of the windshield receiving channel along the lower edge of the windshield will drain into passages 160 and 162 and will flow towards the sides of the windshield, since the lower edge of the windshield and channels 160 and 162 have their highest point at the center line of the body as can be seen in Figures 1 and 2. Thus, any of the moisture entering passages 160 and 162 will flow toward the sides of the body and will tend to collect at the lowest points in the passages.

Referring now to Figure 2 of the drawings, the lowest points of the weather strip are on either side of the body approximately at the offset portions 128 of drain trough 82. Thus, all of the moisture collected in passages 160 and 162 will tend to flow toward these points within the passages.

Referring now to Figures 3, 4, and 5, it is possible for moisture to enter the body by passing along the outer body sealing surfaces 53', 54', and 56' into passage 182 and then passing along the inner body sealing surface 62' to the interior of the body. This drainage is more apt to take place across the upper edge of the windshield than across the sides and lower edges thereof since the moisture enters downwardly into passage 182 across the upper edge of the windshield rather than upwardly into the passage across the lower edge of the windshield. After enough moisture has collected in passage 182, it will tend to overflow into the body along the inner body sealing surface 62'.

Referring now particularly to Figures 8 and 9, it will be noted that surface 150 of leg portion 140 is provided with the thin flexible lips 146 and 148. When the weather strip is installed on the body, these lips are bent inwardly against the surface 150 as shown in Figure 3 to provide additional sealing along the outer body sealing surface portion 54'. This additional sealing provided by the thin flexible lips will aid in preventing moisture from entering into drain passage 182.

Since passage 182 is of the same general shape as drain passages 160 and 162 of the windshield receiving channel, any moisture entering into this drain passage will tend to flow toward the lowest points in the weather strip as previously set forth in conjunction with passages 160 and 162. Thus, the moisture entering into the drain passage 182 will tend to flow toward the offset portions 128 of the drain trough 82 on either side of the body which are drained by tubes 134 as previously set forth.

Referring now particularly to Figures 5, 7, and 9, it will be noted that a pair of cross-over passages 184 and 186 are provided in leg portion 152 of the weather strip in the area of the drain tube 134. These passages are provided in order to drain the moisture collecting in the drain channels 160 and 162 at the lowest points of the body, since otherwise the moisture would overflow at these points and pass into the body from between the windshield and the weather strip. Thus, the moisture collecting at the lowest points of passages 160 and 162 passes into the drain passage 182 through the cross-over passages. In addition to the cross-over passages, additional passages 188 are also formed in wall 170 of the flange structure receiving channel 138 to drain the water from passage 182 into the drain trough 82 where it passes to the exterior of the body through tube 184.

Although only two such cross-over passages 184 and 186 and only a single passage 188 are shown on either side of the body, it is obvious that more such passages may be provided if required.

As previously mentioned, the drain trough 82 extends entirely around the lower edge of the windshield. Thus, it is possible to form cross-over passages 184 and 186 at various points in leg portion 152 across the lower edge of the windshield and to form additional passages 188 in wall 170. These passages will drain into the drain trough, and the moisture collecting in the drain trough will flow toward the sides thereof to the drain tubes 134, since the highest point in the drain trough is at the center line of the body at the lower edge of the windshield.

Thus, this invention provides an improved weather strip for vehicle windshields which is self-draining to prevent moisture from entering into the body from between the weather strip and the windshield or from between the weather strip and the flange structure 57 which supports the weather strip on the vehicle body. No sealers or adhesives are required in order to seal the areas between the windshield and the weather strip and between the flange structure 57 and the weather strip since it is intended that moisture will enter the various drain passages between the weather strip and these members.

It will be noted that the drain passages are enclosed within the weather strip and do not open to the exterior of the body in any manner between the windshield and the weather strip channel or between the body metal and the weather strip. By so enclosing the drain passages within the weather strip and by having the weather strip channels receive the windshield and the body flange structure in sealing engagement, an adequate seal is obtained and the drain passages are less apt to become completely filled with water beyond their capacity.

While a specific embodiment of this invention has been shown and described, various changes and modifications may be made within the scope and spirit of the invention.

I claim:

1. In combination with a vehicle body having a closure opening therein and flange structure adjacent said closure opening, weather strip means mounted on said flange structure and including oppositely opening channel means for respectively receiving an edge portion of said closure and said flange structure in sealing engagement therewith, and drain passage means enclosed within said weather strip means and located adjacent said channel means receiving said flange structure in communication therewith for receiving moisture entering said channel means between said flange structure and said weather strip means.

2. In combination with a vehicle body having a closure opening therein and flange structure on said body projecting generally inwardly with respect to said opening, a closure adapted to close said opening, weather strip means having oppositely opening channel means therein, one of said channel means receiving said flange structure in sealing engagement therewith and the other of said channel means receiving an edge portion of said closure in sealing engagement therewith to locate said closure in spaced relationship to said flange structure, continuous passage means enclosed within said weather strip means and in communication with each of said channel means thereof for receiving any moisture entering said each of said channel means between said weather strip means and said edge portion of said closure and between said weather strip means and said flange structure, and drain passage means for said continuous passage means opening exteriorly of said body.

3. In combination with a vehicle body having a closure opening therein and flange structure on said body projecting generally inwardly with respect to said opening, a closure adapted to close said opening, weather strip means having oppositely opening channel means therein, one of said channel means receiving said flange structure in sealing engagement therewith to mount said weather strip means on said body and the other of said channel means receiving an edge portion of said closure in sealing engagement therewith to locate said closure in spaced relationship to said flange structure means, first and second continuous passage means enclosed within said weather strip means in communication with a respective channel means thereof for receiving any moisture entering said channel means between said flange structure and said weather strip means and said edge portion of said closure and said weather strip means, said continuous passage means being in communication with each other at spaced points within said weather strip means, and drain passage means in communication with at least one of said passage means for receiving moisture entering said at least one of said passage means to drain the moisture collecting therein.

4. In combination with a vehicle body having a closure opening therein and flange structure on said body projecting generally inwardly with respect to said opening, weather strip means having spaced oppositely opening channel means therein, one of said channel means receiving said flange structure in sealing engagement therewith and the other of said channel means receiving an edge portion of said closure in sealing engagement therewith to locate said closure in spaced relationship to said flange structure, first and second continuous passage means in the base of each of said channel means for receiving moisture entering said channel means between said edge portion of said closure and said weather strip means and between said flange structure and said weather strip means, said passage means being in communication with each other at spaced points within said weather strip means, and drain passage means in communication with one of said passage means to drain moisture collecting therein.

5. In combination with a vehicle body having a windshield opening therein and flange structure on said body adjacent said opening and projecting generally inwardly with respect thereto, a windshield adapted to close said opening, continuous weather strip means having spaced oppositely opening continuous channels therein, one of said channels receiving said flange structure and the other of said channels receiving the edge portion of said windshield to mount said windshield within said opening in spaced relationship to said flange structure, first passage means within said weather strip means in communication with said flange structure channel means for receiving moisture entering said channel means between said weather strip means and said flange structure, second channel means within said weather strip means in communication with said windshield channel means for receiving moisture entering said windshield channel means between said windshield and said weather strip means, spaced cross over passage means between said first and second passage means at the lowest points of said weather strip means with respect to said body, and drain passage means in communication with one of said channel means adjacent said cross over passages for draining moisture collecting therein.

6. In combination with a vehicle body having a closure opening therein and flange structure on said body projecting generally inwardly with respect to said closure opening, a closure adapted to close said opening, weather strip means mounted on said flange structure and including channel means located in outwardly spaced relationship to said flange structure for grippingly receiving an edge portion of said closure in sealing engagement therewith to locate said closure in outwardly spaced relationship to said flange structure, passage means completely enclosed within said weather strip means and located adjacent said channel means in communication therewith for receiving any moisture entering said channel means from the exterior of said body between the outer surface of said edge portion of said closure and said weather strip means, and drain means enclosed within said weather strip means and extending from said passage means over said flange structure to drain moisture collected within said passage means.

7. In combination with a vehicle body having a closure opening therein and flange structure on said body projecting generally inwardly with respect to said closure opening, a closure adapted to close said opening, weather strip means mounted on said flange structure and including channel means located in outwardly spaced relationship to said flange structure for grippingly receiving an edge portion of said closure in sealing engagement therewith to locate said closure in outwardly spaced relationship to said flange structure, passage means completely enclosed within said weather strip means and located adjacent said channel means in communication therewith for receiving any moisture entering said channel means from the exterior of said body between the outer surface of said edge portion of said closure and said weather strip means, and drain means enclosed within said weather strip means at the lowest points of said weather strip means with respect to said body, said drain means extending from said passage means over said flange structure to drain moisture collected within said passage means.

References Cited in the file of this patent

UNITED STATES PATENTS

| | | |
|---|---|---|
| 1,461,079 | Beitman | July 10, 1923 |
| 2,569,955 | Schassberger | Oct. 2, 1951 |
| 2,606,059 | Wernig | Aug. 5, 1952 |
| 2,606,635 | Clingman | Aug. 12, 1952 |
| 2,705,819 | Gellert et al. | Apr. 12, 1955 |
| 2,769,657 | Frie et al. | Nov. 6, 1956 |

FOREIGN PATENTS

| | | |
|---|---|---|
| 154,134 | Australia | Dec. 4, 1952 |
| 800,333 | Germany | Oct. 30, 1950 |
| 818,907 | Germany | Oct. 29, 1951 |
| 478,077 | Italy | Feb. 13, 1953 |